(12) United States Patent
Doran

(10) Patent No.: US 11,505,494 B2
(45) Date of Patent: Nov. 22, 2022

(54) SILICONE COATING SUITED FOR AUTOMOTIVE WINDSHIELDS AND PROCESS FOR PREPARATION

(71) Applicant: Raymond T. Doran, Lindenhurst, NY (US)

(72) Inventor: Raymond T. Doran, Lindenhurst, NY (US)

( * ) Notice: Subject to any disclaimer, the term of this patent is extended or adjusted under 35 U.S.C. 154(b) by 288 days.

(21) Appl. No.: 16/382,766

(22) Filed: Apr. 12, 2019

(65) Prior Publication Data

US 2019/0299753 A1 Oct. 3, 2019

Related U.S. Application Data

(60) Continuation of application No. 15/802,072, filed on Nov. 2, 2017, now Pat. No. 10,625,577, which is a division of application No. 14/268,123, filed on May 2, 2014, now Pat. No. 9,809,090.

(51) Int. Cl.
*C03C 17/30* (2006.01)
*B05D 5/00* (2006.01)
*B60J 1/00* (2006.01)
*B05D 1/28* (2006.01)

(52) U.S. Cl.
CPC ............... *C03C 17/30* (2013.01); *B05D 5/00* (2013.01); *B60J 1/002* (2013.01); *B05D 1/28* (2013.01); *B05D 2203/35* (2013.01); *C03C 2217/76* (2013.01)

(58) Field of Classification Search
CPC .. C03C 17/3405; C03C 17/3482; C03C 17/30
See application file for complete search history.

(56) References Cited

U.S. PATENT DOCUMENTS

| 3,244,541 A * | 4/1966 | Fain ....................... C04B 41/009 106/13 |
| 6,465,108 B1 * | 10/2002 | Kamitani ................. C03C 1/008 106/287.16 |
| 2009/0197047 A1 * | 8/2009 | Teranishi ................ C03C 17/25 428/141 |

* cited by examiner

*Primary Examiner* — Alex A Rolland
(74) *Attorney, Agent, or Firm* — Sorell, Lenna & Schmidt, LLP

(57) ABSTRACT

A silicone coating is provided for glass and other surfaces with improved glass clarity and maintenance requirements. In addition, a process for preparing a film with improved glass clarity and maintenance requirements. Further a method is provided for adhering an improved coating to a glass (or other) surface. Also a silicone coating is provided for granite, cement, and lexan/plastic.

16 Claims, 1 Drawing Sheet

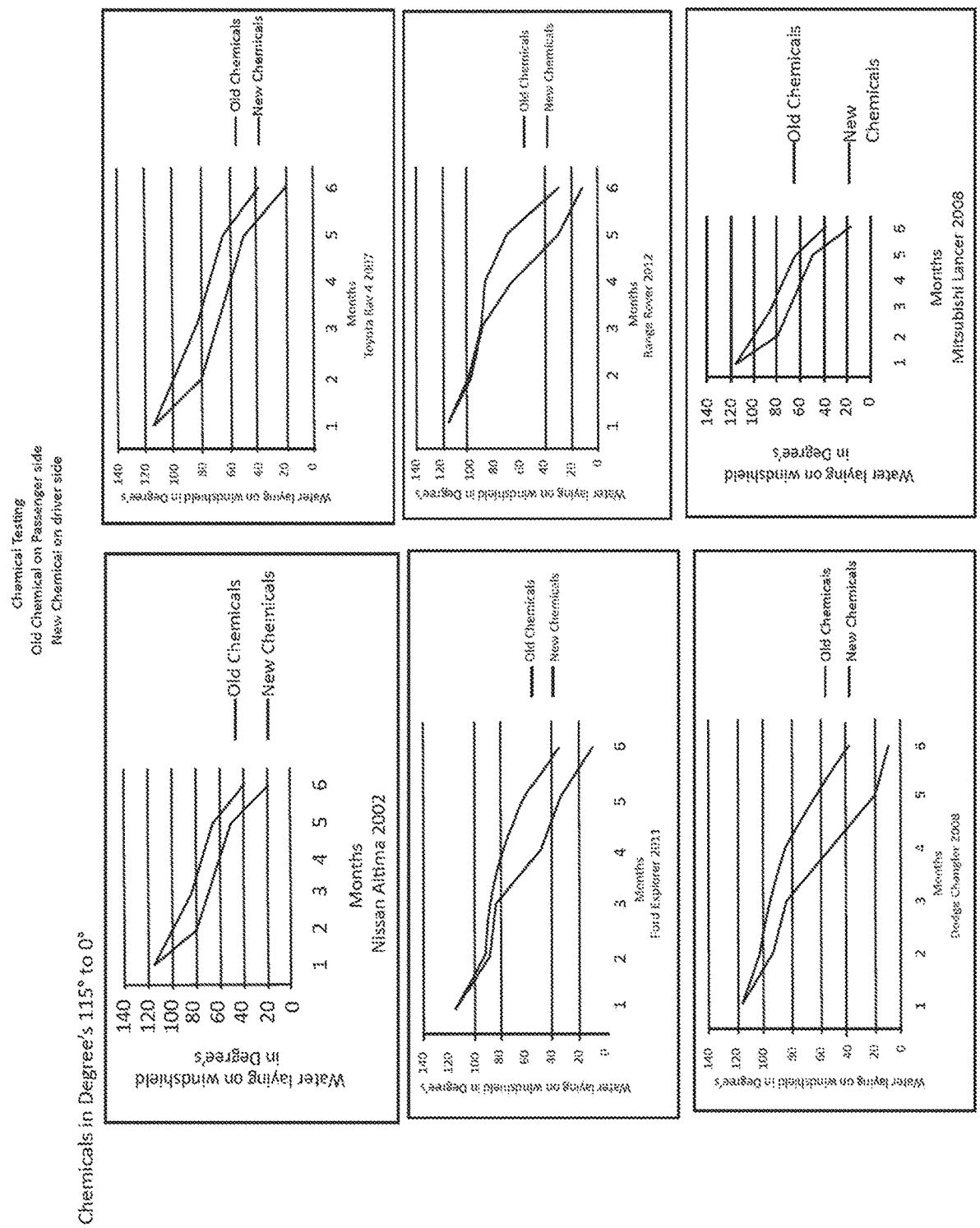

SILICONE COATING SUITED FOR AUTOMOTIVE WINDSHIELDS AND PROCESS FOR PREPARATION

CROSS-REFERENCE TO RELATED APPLICATIONS

This application is a continuation of application U.S. patent application Ser. No. 15/802,072, filed on Nov. 2, 2017, which is a continuation of application U.S. patent application Ser. No. 14/268,123, filed on May 2, 2014, now U.S. Pat. No. 9,809,090. These applications are expressly incorporated by reference herein, in their entireties.

RELATED APPLICATION

The present application is a divisional application of U.S. Ser. No. 14/268,123 filed on May 2, 2014 and claims priority there under pursuant to 37 USC 120.

BACKGROUND

1. Field

This invention relates to a silicon film for coating glass and other surfaces, and process for its preparation. In particular the present invention relates to an improved silicone coating and method for the same that provides for better and more effective protection of glass surfaces including improved coated glass clarity, enhanced hydrophobic properties and reduced maintenance requirements. such as but not limited to automotive vehicle windshields.

2. The Related Prior Art

Glass products are often coated with silicone films to provide them with a cleanable, water repellant surface. Silicones are polymers that include silicon, C, H, O and other elements $(R_2SO_2)_n$. Silicone films are attached to surfaces by chemical bonding. The instant invention improves the strength of the chemical bonding of the silicone to the surface it is applied to over prior coatings. Various methods exist for creating silicone coatings, notably that indicated in U.S. Pat. No. 6,245,387 to Hayden (hereinafter the Hayden patent), and commercially known as the Diamond Fusion process; and applicant's old chemical process, whose film provides the commercially known compound. However, the Hayden patent process provides a coating that requires a watered surface for application, while the instant invention may be applied to dry surfaces. While applicant's old chemical process does permit dry application, the present invention provides a coating with surprisingly improved coated glass clarity, enhanced hydrophobic properties and reduced maintenance requirements. This product may be used on automobile windshields, but also on a wide range of products.

SUMMARY

The present invention provides a coating for glass and other surfaces with improved glass clarity and maintenance requirements and a process for preparing the same. It provides a method for adhering an improved silicone coating to a glass (or other) surface and for a silicone coating for granite, cement, and lexan/plastic.

Further objects and advantages of this invention will be apparent from the following detailed description and examples of a presently preferred embodiment.

BRIEF DESCRIPTION OF THE DRAWING

FIG. 1 illustrates in detail the improved maintenance ability of the invention over a prior art coating.

DETAILED DESCRIPTION OF THE PREFERRED EMBODIMENT(S)

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Referring to FIG. 1, FIG. 1 demonstrates that the prior art compound commercially called "the Crystal Fusion Process" and listed here as "old chemical" has a decreased ability to "bead" up on the windshield at various temperatures over time as versus the "new chemical" of the invention. The prior art compound is adhered on the passenger side of 6 different makes of automobile (Nissan Altima 2002, Ford Explorer 2011, Dodge Charger 2008, Toyota Rav 4 2007, Range Rover 2013 and Mitsubishi Lancer 2008), while the coating of the invention ("new chemical" is adhered to the driver side of the very same vehicle. The consequent "beading up" on each side is tested over the course of 6 months at various temperatures, and the coating of the invention is shown to maintain its beading up ability for a longer period of time than the prior art compounds. This demonstrates its ability to remain on the windshield for a longer period of time decreasing maintenance and resultant costs.

In order to provide the instant silicone coating, dimethyldiethoxysilane (commercial known as GP-49 tm) is reacted with an acid, preferably sulfuric acid, and the silicon oxygen bonds are cleaved providing a step one chemical. The resulting step one chemicals are further reacted with an alcohol, preferably isopropanol in highly specific ratios providing a step 2 chemical. Step 1 and 2 chemicals are mixed together to provide chemical A. The Step 2 chemical has a further small amount of acid added to it, providing a chemical B. Finally, chemicals A and B are mixed together, providing the silicone coating of the invention. The highly specific ratios of the invention are demonstrated in the below example I. In the instant invention GP-49TM is 60% of the composition, the alcohol (preferably isopropanol) is 40% and the acid (preferably sulfuric acid) is 0.040%.

Hydrophobic coatings have been shown to improve the visibility of the glass product. The instant invention improves the glass clarity beyond the prior art coatings. Significantly, driver reaction time is enhanced by the improved visibility. Improved visibility is also superior due to the enhanced maintenance function of the invention, as dirt, moisture and insects cling to the surface less than prior art products. The enhanced maintenance ability of the instant invention is demonstrated in FIG. 1.

EXAMPLE 1

Process for Preparing Silicone Coating:
1. Take 2, 1 gallon empty Amber jugs and fill them up with dimethyldiethoxysilane (GP-49 tm) and add a half of an ounce of acid—let sit for 48 hours.

2. Then take 2 empty one gallon Amber jugs and put 118 oz of Isopropanol alcohol in each one and then remove 10 oz of step 1 (dimethyldiethoxysilane and acid) and add it to the 118 oz isopropanol alcohol giving you 128 oz (1 gallon) and let sit for 48 hours. This provides Step 1 chemical take 70.5 oz of Step 1 chemical (dimethyldiethoxysilane and acid) and pour into an empty 1 gallon Amber jug.
3. Then take 57.5 oz of step 2 (Isopropanol w/dimethyldiethoxysilane/acid) and pour it into the jug with the 70.5 oz and let sit for 48 hours. That will make a finished 1 gallon chemical A.
4. Take the 1 gallon of step 2 chemical (Isopropanol with the GP-49/acid) and add 1 Tsp. of Acid and let sit for 48 hours. And that will make a finished 1 gallon chemical B.
5. The steps above will make a finished 1 gallon of step A and 1 gallon of step B.

This provides 55 one gallon jugs of each chemical and both are poured into a 55 gallon drum for commercial use.

EXAMPLE II

Processing for Applying a Chemical Coating to a Glass Surface
Clean the glass surface before application, preferably with alcohol, rinse with water, and then dry. Apply Chemical A to the surface with a wipette. Let dry, and apply chemical B, also with a wipette to the glass surface. Let dry. The resulting coating will have the improved maintenance properties demonstrated in FIG. 1.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method comprising:
applying a first chemical to a surface; and
applying a second chemical to the surface after the first chemical is applied to the surface,
wherein the first chemical comprises a first percentage by volume of an organosilicon compound, a first percentage by volume of an alcohol, and a first percentage by volume of an acid,
wherein the second chemical consists of a second percentage by volume of the organosilicon compound, a second percentage by volume of the alcohol, and a second percentage by volume of the acid, and
wherein the first percentage by volume of the organosilicon compound is different than the second percentage by volume of the organosilicon compound, the first percentage by volume of the alcohol being different than the second percentage by volume of the alcohol, the first percentage by volume of the acid being different than the second percentage by volume of the acid,
wherein the first percentage by volume of the organosilicon compound is about 58% volume/volume and the second percentage by volume of the organosilicon compound is about 8% volume/volume,
wherein the first percentage by volume of the acid is about 0.11% volume/volume and the second percentage by volume of the acid is about 0.14% volume/volume,
wherein the organosilicon compound is dimethyldiethoxysilane, and
wherein the acid is sulfuric acid.

2. The method recited in claim 1, wherein the alcohol is a secondary alcohol.

3. The method recited in claim 1, wherein the alcohol is isopropanol.

4. The method recited in claim 1, wherein the first percentage by volume of the alcohol is less than the second percentage by volume of the alcohol.

5. The method recited in claim 1, wherein the second percentage by volume of the alcohol is more than two times greater than the second percentage by volume of the alcohol.

6. The method recited in claim 1, wherein the first percentage by volume of the alcohol is about 53% volume/volume and the second percentage by volume of the alcohol is about 92% volume/volume.

7. The method recited in claim 1, wherein the surface is dry when the first chemical is applied to the surface.

8. The method recited in claim 1, further comprising drying the first chemical on the surface before applying the second chemical to the surface.

9. The method recited in claim 1, further comprising cleaning the surface before applying the first chemical to the surface.

10. The method recited in claim 9, wherein cleaning the surface comprises cleaning the surface with alcohol, rinsing the surface with water and letting the surface dry.

11. The method recited in claim 1, wherein the chemicals are each applied to the surface using a wipette.

12. The method recited in claim 1, wherein the surface is a granite surface.

13. The method recited in claim 1, wherein the surface is a cement surface.

14. The method recited in claim 1, wherein the surface is a plastic surface.

15. A method comprising:
applying a first chemical to a glass surface when the glass surface is dry;
drying the first chemical on the glass surface; and
applying a second chemical to the glass surface after the first chemical is dried on the glass surface,
wherein the first chemical comprises a first percentage by volume of dimethyldiethoxysilane, a first percentage by volume of isopropanol, and a first percentage by volume of sulfuric acid,
wherein the second chemical consists of a second percentage by volume of dimethyldiethoxysilane, a second percentage by volume of isopropanol, and a second percentage by volume of sulfuric acid,
wherein the first percentage by volume of dimethyldiethoxysilane compound is about 58% volume/volume and the second percentage by volume of dimethyldiethoxysilane compound is about 8% volume/volume, and
wherein the first percentage by volume of sulfuric acid is about 0.11% volume/volume and the second percentage by volume of sulfuric acid is about 0.14% volume/volume.

16. A method comprising:
applying a first chemical to a glass surface when the glass surface is dry;
drying the first chemical on the glass surface; and
applying a second chemical to the glass surface after the first chemical is dried on the glass surface, wherein the first chemical comprises a first percentage by volume of dimethyldiethoxysilane, a first percentage by volume of isopropanol, and a first percentage by volume of sulfuric acid, wherein the second chemical consists of a second percentage by volume of dimethyldiethoxysilane, a second percentage by volume of isopropanol, and a second percentage by volume of sulfuric acid, wherein the first percentage by volume of dimethyldiethoxysilane is about 58% volume/volume and the second percentage by volume of dimethyldiethoxysilane is about 8% volume/volume, wherein the first percentage by volume of isopropanol is about 53% volume/volume and the second percentage by volume of isopropanol is about 92% volume/volume, and wherein the first percentage by volume of sulfuric acid is about 0.11% volume/volume and the second percentage by volume of sulfuric acid is about 0.14% volume/volume.

\* \* \* \* \*